United States Patent [19]  
Uchiyama et al.

[11] Patent Number: 4,849,304  
[45] Date of Patent: Jul. 18, 1989

[54] OPTICAL RECORDING MEDIUM
[75] Inventors: Kenji Uchiyama; Hideki Ishizaki; Hajime Utsunomiya; Suguru Takayama, all of Nagano, Japan
[73] Assignee: TDK Corporation, Tokyo, Japan
[21] Appl. No.: 133,876
[22] Filed: Dec. 16, 1987
[30] Foreign Application Priority Data Dec. 17, 1986 [JP] Japan .................. 61-300859
Dec. 18, 1986 [JP] Japan .................. 61-302275
Dec. 19, 1986 [JP] Japan .................. 61-303224
Dec. 24, 1986 [JP] Japan .................. 61-313614
Jun. 19, 1987 [JP] Japan .................. 62-153027

[51] Int. Cl.$^4$ ............................... G11B 7/24
[52] U.S. Cl. ................... 428/694; 428/469; 428/472; 428/698; 428/699; 428/702; 428/704; 428/900
[58] Field of Search ........... 428/694, 900, 469, 472, 428/698, 699, 702, 704; 360/131-135; 365/122; 369/13, 288

[56] References Cited  
U.S. PATENT DOCUMENTS 4,645,722 2/1987 Katagawa et al. ............ 428/900
4,658,388 4/1987 Ishiwatari et al. ............ 430/961
4,661,420 4/1987 Nakamura et al. ............ 428/692
4,680,742 7/1987 Yamada et al. ............... 430/995
4,743,502 5/1988 Yoshitoni ..................... 428/336

FOREIGN PATENT DOCUMENTS 163810 12/1985 European Pat. Off. .
210405 2/1987 European Pat. Off. .
2558003 7/1985 France .
289558 12/1986 Japan .
289559 12/1986 Japan .
289560 12/1986 Japan .
2143689 2/1985 United Kingdom .

Primary Examiner—George F. Lesmes  
Assistant Examiner—James B. Monroe  
Attorney, Agent, or Firm—Oblon, Fisher, Spivak, McClelland & Maier

[57] ABSTRACT

An optical recording medium comprising a recording layer on a substrate and a protective layer formed adjacent to the upper and/or lower surface of the recording layer is more durable and corrosion resistant when the protective layer has a composition comprising, in % by weight, 40–60% of $SiO_2$, 0.5–10% of an alkali metal oxide, 10–59.5% of $Al_2O_3$ and/or $B_2O_3$, and optionally up to 50% of a divalent metal oxide.

15 Claims, 1 Drawing Sheet

OPTICAL RECORDING MEDIUM

BACKGROUND OF THE INVENTION

This invention relates to optical recording media.

For optical recording media of magneto-optical memory type, there are well known a number of materials for a recording layer thereof, for example, MnBi, MnAlGe, MnSb, MnCuBi, GdFe, TbFe, GdCo, PtCo, TbCo, TbFeCo, GdFeCo, TbFeO$_3$, GdIG (gadolinium iron garnet), GdTbFe, GdTbFeCoBi, CoFe$_2$O$_4$, etc. These materials are deposited on transparent substrates of plastic material or glass as a thin film by any suitable thin-film forming techniques such as vacuum deposition or sputtering. The features common to these magneto-optical recording thin film layers are that the axis of easy magnetization is perpendicular to the film surface and that Kerr and Farady effects are great.

Requirements imposed on such magneto-optical recording media are:

(1) that the Curie point is of the order of 100° to 200° C. and the compensation point is close to room temperature, (2) that noise-inducing defects such as grain boundaries are relatively fewer, and (3) that a magnetically and mechanically uniform film is obtained over a relatively large area.

In the light of these requirements, a great attention is recently drawn to amorphous perpendicular magnetizable thin films of rare earth element-transition metal among the above-mentioned materials. Magneto-optical recording media having such amorphous perpendicular magnetizable thin films of rare earth element-transition metal, however, have a storage problem. If the magnetic thin film layers are stored in contact with the ambient atmosphere, rare earth elements therein are preferentially erroded or oxidized by oxygen and moisture in the atmosphere, losing the necessary information recording and reproducing ability.

For this reason, most investigations are generally directed to those recording media of the construction having a protective layer disposed on a surface of a magnetic thin film layer adjacent to or remote from the substrate. Known protective layers are vacuum deposited films of inorganic materials such as silicon monoxide, silicon dioxide, aluminum nitride, silicon nitride and zinc sulfide as well as resinous coatings (see Japanese Patent Application Kokai No. 58-80142). However, these protective layers are insufficient in moisture protection or adhesion to the substrate.

A protective layer of an inorganic glass based composition is also known as achieving some improvements in durability of the medium, particularly prevention of moisture penetration and adhesion improvement. Japanese Patent Application Kokai No. 59-162621 discloses a glass layer vacuum deposited on a plastic substrate, the glass comprising 80 to 90% by weight of SiO$_2$, 5 to 15% by weight of B$_2$O$_3$, 1 to 10% by weight of Al$_2$O$_3$, and 1 to 10% by weight of Na$_2$O. Japanese Patent Application Kokai No. 60-177449 discloses a thin film layer of inorganic glass interposed between a substrate and a recording layer. The glass is typically an alkali-free glass composition commercially available from Corning Glass as Code No. 7059 having the composition of 49.9% SiO$_2$, 10.5% B$_2$O$_3$, 4.3% CaO, 25.1% BaO, and 10.3% Al$_2$O$_3$.

These approaches, however, do not fully meet the strict requirements of durability and corrosion resistance on magneto-optical recording media. There is a need for a magneto-optical recording medium having more improved properties.

The same problem arises in a magneto-optical recording medium having a recording layer of the so-called phase conversion type.

SUMMARY OF THE INVENTION

One object of the present invention is to provide a novel and improved optical recording medium having improved durability and corrosion resistance.

Another object of the present invention is to provide a novel and improved optical recording medium having a recording layer which is unlikely to deteriorate.

A further object is to provide an optical recording medium of the type wherein information is recorded and reproduced with the use of heat and light of a laser beam.

The present invention is directed to an optical recording medium comprising a substrate, a recording layer on the substrate having upper and lower surfaces remote from and adjacent to the substrate, and a protective layer formed on the upper and/or lower surface of the recording layer with or without an intermediate layer.

According to the feature of the present invention, the protective layer has a composition comprising (a) silicon oxide, (b) an alkali metal oxide, and (c) aluminum oxide, boron oxide, or a mixture of aluminum oxide and boron oxide wherein the content of silicon oxide (a) is from about 40 to 60% by weight calculated as SiO$_2$ and the content of alkali metal oxide (b) is from about 0.5 to 10% by weight based on the total weight of the composition.

In one preferred embodiment, the protective layer composition further comprises (d) up to about 50% by weight of a metal oxide represented by M(II)O wherein M(II) is a divalent metal.

The content of aluminum oxide and/or boron oxide ranges from about 10 to 59.5% by weight, more precisely from about 30 to 59.5% by weight when the composition consists essentially of component (a), (b), and (c) and from about 10 to 49.5% by weight when the composition consists essentially of component (a), (b), (c) and (d).

In another preferred embodiment, about 10 to 49.5% by weight of a mixture of aluminum oxide and boron oxide is present as component (c) and the content of metal oxide represented by M(II)O ranges from about 10 to 49.5% by weight in the protective layer composition.

In a further preferred embodiment, the protective layer composition further contains about 3 to 175 atom % of at least one rare earth element selected from the group consisting of yttrium, the lanthanide elements and the actinide elements.

Preferably, an intermediate layer is formed contiguous to the lower surface of the recording layer. The intermediate layer contains at least two types of metal and metalloid compounds, wherein at least two elements selected from the group consisting of metals and metalloids are present in the form of an oxide and/or nitride.

Best protection is achieved when two protective layers are formed adjacent to the upper and lower surfaces of the recording layer.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
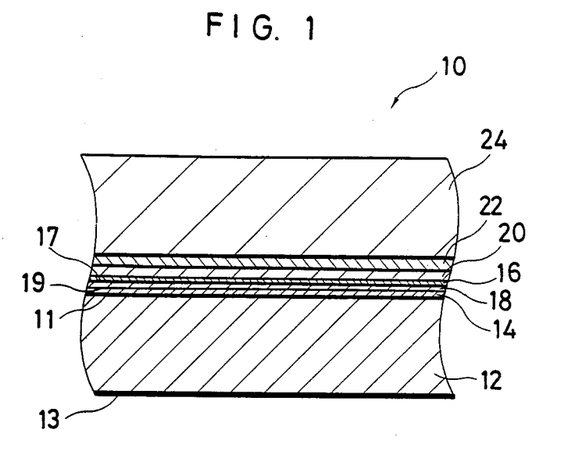
FIG. 1 is a cross-sectional view of an optical recording medium according to one embodiment of the present invention.
Figure 2:
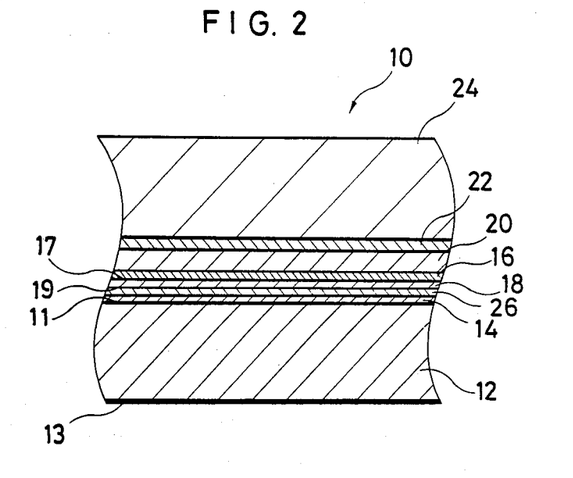
FIG. 2 is a cross-sectional view of an optical recording medium according to another embodiment of the present invention.

Two preferred embodiments of the optical recording medium of the present invention are illustrated in FIGS. 1 and 2. They have substantially the same structure except for the presence of an intermediate layer in FIG. 2. Like reference numerals designate identical or corresponding parts throughout the figures.

The optical recording medium according to the present invention is generally designated at 10 as comprising a substrate 12 having a pair of opposed major surfaces 11, 13 and a recording layer in the form of a magnetic thin-film layer 18 on the upper surface 11 of the substrate. The magnetic thin-film layer 18 has a pair of opposed major surfaces, that is; an upper surface 17 disposed remote from the substrate 12 and a lower surface 19 disposed adjacent to the substrate 12. The medium further includes protective layers 14 and 16 of vitreous material formed adjacent to the lower and upper surfaces 19 and 17 of the magnetic thin-film layer 18, respectively. As seen from the figure, the lower protective layer 14 is disposed between the substrate 12 and the magnetic thin-film layer 18, and the upper protective layer 16 is disposed on the upper surface 17 of the magnetic thin-film layer 18.

Although two protective layers 14 and 16 are illustrated in FIGS. 1 and 2, the present invention only requires the provision of at least one of the protective layers. In order to completely protect the magnetic thin-film layer 18, it is desired to form a protective layer on either surface of the magnetic thin-film layer as illustrated in the figure.

Each of the protective layers 14 and 16 has a vitreous composition comprising (a) silicon oxide, (b) an alkali metal oxide, and (c) at least one of aluminum oxide and boron oxide. The contents of these components, expressed in % by weight based on the total weight of the protective layer composition, must fall within specific ranges as defined below. The content of silicon oxide (a) ranges from about 40 to 60% by weight calculated as $SiO_2$. The content of alkali metal oxide (b) ranges from about 0.5 to 10% by weight. The content of component (c) ranges from about 10 to 59.5% by weight.

The content of silicon oxide (a) ranges from about 40 to 60% by weight of $SiO_2$ based on the total weight of the protective layer composition. A silicon oxide content in excess of 60% is detrimental to corrosion resistance whereas less than 40% of silicon oxide provides a less stable layer. Silicon oxide is generally present in the protective layer in the form of $SiO_2$.

The content of alkali metal oxide (b) ranges from about 0.5 to 10% by weight based on the total weight of the protective layer composition. An alkali metal oxide content in excess of 10% will sometimes adversely affect the adjoining magnetic layer. Less than 0.5% of alkali metal oxide is ineffective to render the protective layer durable. The preferred alkali metal oxide content ranges from about 1.0% to 7.0% by weight.

The alkali metal oxides include $Li_2O$, $Na_2O$, $K_2O$, $Rb_2O$, $Cs_2O$, $Fr_2O$, etc. with the lithium oxide, sodium oxide and potassium oxide being preferred. These oxides may be used alone or in admixture of two or more.

The protective layer composition further contains boron oxide or aluminum oxide or a mixture of boron oxide and aluminum oxide as component (c) in an amount of from 10 to 59.5% by weight in a broadest aspect. The content of component (c) ranges from about 30 to 59.5% by weight when the composition consists essentially of components (a), (b) and (c). The content of component (c) ranges from about 10 to 49.5% by weight when the composition further contains an additional component (d) as will be described later. Boron oxide and aluminum oxide are generally present in the protective layer in the form of $B_2O_3$ and $Al_2O_3$, respectively. The durability, corrosion resistance, and evenness of the medium are improved by introducing a predetermined amount of boron oxide or aluminum oxide or a mixture of boron oxide and aluminum oxide.

When component (c) is a mixture of boron oxide and aluminum oxide, the composition contains about 1.0 to 40% by weight of boron oxide and about 3.0 to 45% by weight of aluminum oxide provided that the total of boron oxide and aluminum oxide is within the above-defined range.

The protective layer composition may further contain an additional component (d) in the form of a metal oxide having the formula M(II)O wherein M(II) is a divalent metal element. Component (d) can be considered as being incorporated in the composition either as an additional component or as a partial substitute for component (c). When component (d) is considered as an additional component, the content of divalent metal oxide is generally up to about 49.5%, preferably from about 10 to 49.5%, most preferably from about 10 to 35% by weight based on the total weight of the protective layer composition. When component (d) is considered as a partial substitute for component (c), the content of divalent metal oxide can be increased up to about 50% by weight based on the total weight of the protective layer composition, provided that the total of components (c) and (d) ranges from about 30 to 59.5%. Preferably, the content of divalent metal oxide is from about 10 to 49.5%, most preferably from about 10 to 35% by weight based on the total weight of the protective layer composition. As long as the content of metal oxide M(II)O is within the upper limit, durability and corrosion resistance are improved while maintaining the effect attributable to the presence of component (c), boron oxide and/or aluminum oxide.

Examples of the metal oxide M(II)O include BaO, CaO, MgO, ZnO, PbO, SrO, etc., with the barium oxide, calcium oxide and strontium oxide being preferred.

In a further aspect of the present invention, the protective layer contains (a) silicon, (b) at least one alkali metal M(I), (c) aluminum and/or boron, and (e) at least one rare earth element selected from the group consisting of yttrium, the lanthanide elements and the actinide elements. The protective layer may further contain (d) at least one divalent metal M(II). Silicon (a), alkali metal (b), aluminum and/or boron (c), and divalent metal (d) are present in the form of oxides to form a vitreous material as a whole. The same ranges as previously described are applicable to these elements through a simple calculation of the stoichiometric composition of oxides of these elements. It is understood that the stoichiometric compositions of oxides of silicon, alkali metal M(I), aluminum, boron, and divalent metal M(II) are $SiO_2$, $M(I)_2O$, $Al_2O_3$, $B_2O_3$, and M(II)O, respectively. The oxides need not be present in their exact stoichiometric composition in the protective layer.

The protective layer contains (e) at least one rare earth element selected from the group consisting of yttrium, the lanthanide elements and the actinide elements. Preferably at least one rare earth element selected from yttrium and lanthanides is present. The presence of such a rare earth element in the protective layer improves the recording sensitivity and carrier-to-noise ratio (C/N) of the associated medium.

Better results are obtained when the protective layer contains at least one element selected from the group consisting of yttrium (Y), lanthanum (La), cerium (Ce), praseodymium (Pr), neodymium (Nd), promethium (Pn), samarium (Sm), and europium (Eu). Not only recording/reproducing performance including recording sensitivity and C/N ratio, but also durability and corrosion resistance are improved.

The rare earth element is present in the protective layer as a mixture with the vitreous material in either an elemental form or a compound form. When the rare earth element is contained as a compound, it is usually present as an oxide.

In order to improve recording/reproducing performance as well as durability and corrosion resistance, the rare earth element is preferably contained in an elemental form or a partial oxide form. Then the rare earth element plays the role of an oxygen trap in the protective layer, contributing to improvements in corrosion resistance and durability.

The rare earth element is present in an amount of about 3 to 175 atom % based on the total of silicon, alkali metal, aluminum and/or boron, and optional divalent metal. The addition of less than about 3 atom % of rare earth element is ineffective for its purpose. More than 175 atom % will adversely affect C/N characteristics.

The rare earth element is preferably contained as an element or a partial oxide containing less than about 90% of oxygen based on the theoretical oxygen quantity derived from its stoichiometric oxide composition which is generally represented by $R_2O_3$ wherein R is a rare earth element, for example, $Y_2O_3$ and $La_2O_3$, with the exception of $CeO_2$ for Ce.

The protective layer is generally in amorphous form in this embodiment.

An elemental analysis of Si, Al, B, alkali metal, divalent metal, Y, lanthanide, actinide and other elements may be carried out by suitable spectroscopy including Auger, SIMS, ESCA, and LAMMA.

When the protective layers FIGS. 14 and 16 are formed contiguous to the, lower and upper surfaces of the magnetic thin-film layer FIG. 18 as illustrated in FIG. 1, these two protective layers may have the same composition or different compositions falling within the above-defined range according to the present invention. It is also within the scope of the present invention that one protective layer has a composition within the present invention and the other protective layer has a composition outside the present invention.

The protective layer may be formed by any desired one of gas phase film-forming techniques including sputtering, evaporation, ion plating, plasma chemical vapor deposition (CVD), and light CVD. Preferred techniques are multiple source sputtering using two or more targets of different compositions and reactive sputtering using oxygen. When the protective layer contains a rare earth element as defined above, sputtering is best suited. Particularly preferred is a double sputtering technique using a target of a vitreous material and another target of a rare earth element.

The thickness of the protective layer preferably ranges from about 300 to 3,000 Å, more preferably from about 500 to 2,000 Å irrespective of whether it is formed adjacent to the lower or upper surface of the magnetic thin-film layer. Weatherability is poor with a thickness of less than about 300 Å. A protective layer having a thickness of more than about 3,000 Å will adversely affect the sensitivity of the medium.

In another embodiment wherein the protective layer FIG. 14 is formed on the substrate FIG. 12 and an intermediate layer 26 (which will be described later) is formed on the protective layer 14 as illustrated in FIG. 2, it is desired that the protective layer 14 be about 300 to 1,000 Å thick and the intermediate layer 26 be about 500 to 1,500 Å thick.

The protective layer may contain some impurities. For example, it is permissible that argon and nitrogen are introduced from the film-forming atmosphere. Other impurities will be introduced from the source materials. For example, $Fe_2O_3$, CuO, $Cr_2O_3$, $MnO_x$, CoO, NiO, $As_2O_3$ may be contained in an amount of less than about 1.0% by weight based on the total weight of the protective layer composition.

The magnetic thin-film layer FIG. 18 is a layer in which signals indicative of information are magnetically recorded using a modulated thermal beam or modulated magnetic field and the recorded signals are reproduced through magnetic-to-optical signal conversion.

The magnetic thin-film layer is generally formed from alloys containing rare earth elements and transition metals by conventional techniques such as sputtering and vacuum deposition to produce an amorphous film to an ordinary thickness. The rare earth elements and transition metals used include all the members of their chemically defined classes. The preferred rare earth elements are gadolinium (Gd) and terbium (Tb), and the preferred transition metals are iron (Fe) and cobalt (Co). The magnetic thin-film layer is preferably comprised of 65 to 85 atom percents of Fe and Co in total and the balance essentially of rare earth metals, especially Gd and/or Tb. Preferred combinations are TbFeCo, GdFeCo, GdTbFeCo, etc. The magnetic thin-film layer may contain less than about 10 atom % of Cr, Al, Ti, Pt, Si, Mo, Mn, V, Ni, Cu, Zn, Ge, Au, etc. The magnetic thin-film layer may also contain less than about 10 atom % of an additional rare earth element such as Sc, Y, La, Ce, Pr, Nd, Pm, Sm, Eu, Dy, Ho, Er, Tm, Yb, Lu, etc.

The magnetic thin-film layers are preferably 100 to 0,000 Å thick.

The material of which the recording layer is made also includes materials of phase conversion type, for example, Te-Se, Te-Se-Sn, Te-Ge, Te-Tn, Te-Sn, Te-Ge-Sb-S, Te-Ge-As-Si, Te-Si, Te-Ge-Si-Sb, Te-Ge-Bi, Te-Ge-In-Ga, Te-Si-Bi-Tl, Te-Ge-Bi-In-S, Te-As-Ge-Sb, Te-Ge-Se-S, Te- Ge-Se, Te-As-Ge-Ga, Te-Ge-S-In, Se-Ge-Tl, Se-Te-As, Se-Ge-Tl-Sb, Se-Ge-Bi, Se-S (see Japanese Patent Publication No. 54-41902 and Japanese Patent No. 1004835), TeO$_x$ (Te dispersed in tellurium oxide as described in Japanese Patent Application Kokai No. 58-54338 and Japanese Patent No. 974257), TeO$_x$+PbO$_x$ (see Japanese Patent No. 974258), TeO$_x$+VO$_x$ (see Japanese Patent No. 974257), chalcogens, for example, Te and Se base materials such as Te-Tl, Te-Tl-Si, Se-Zn-Sb, Te-Se-Ga, and TeN$_x$, alloys capable of amorphous-crystal transformation such as Ge-Sn and Si-Sn, alloys capable of color change through crystal structure transformation such as Ag-Zn, Ag-Al-Cu, and CuAl, and alloys capable of grain size change such as In-Sb.

The recording layer may be formed by any desired dry coating technique including evaporation, sputtering, and ion plating. The recording layer generally has a thickness of from about 20 nm to about 1 μm.

The substrate FIG. 12 for use in the optical recording medium according to the present invention is generally formed of glass or a resinous material. Typical resins include acrylic resins, polycarbonate resins, epoxy resins, and olefinic resins such as polymethylpentene. Preferred among these resins are polycarbonate resins because of their durability, especially resistance to warpage.

The polycarbonate resins used herein may be aliphatic polycarbonates, aromatic-aliphatic polycarbonates and aromatic polycarbonates, with the aromatic polycarbonates being particularly preferred. Polycarbonates derived from bisphenols are preferred because of melting point, crystallinity and ease of handling. The most preferred is a bisphenol-A polycarbonate. The polycarbonate resin preferably has a number average molecular weight of from about 10,000 to 15,000.

The substrate 12 preferably has a refractive index of from about 1.55 to 1.59 at a wavelength of 830 nm. Since recording is generally carried out through the substrate, the transmittance of recording or reading-out light is preferably 86% or higher.

In general, the substrate is of disk shape although it may have another shape such as tape and drum.

The surface 11 of such a disk-shaped substrate 12 on which the magnetic thin-film layer 18 is formed may be provided with a tracking channel. The channel has a depth of about λ8n, especially from λ6n to λ12n wherein n is the refractive index of the substrate. The channel has a width of about 0.4 to 2.0 μm. The substrate may also be formed with a pit for addressing purpose.

Those portions of the magnetic thin-film layer which are located on the bottom of the channels constitute recording tracks where writing and reading light beams are preferably directed from the lower surface of the substrate. With this construction, the reading C/N ratio is improved and a control signal of a greater magnitude is available for tracking.

The protective layer 16 or 14 according to the present invention may be formed adjacent to the upper and/or lower surface of the magnetic thin-film layer 18 with or without an intermediate layer. That is, an intermediate layer may be formed between the magnetic thin-film layer and the protective layer. Most preferably, an intermediate layer 26 is formed between the magnetic thin-film layer 18 and the lower protective layer 14 which is contiguous to the substrate 12 as illustrated in FIG. 2.

The intermediate layer may be formed from a variety of dielectric materials, for example, compounds containing oxygen, carbon, nitrogen and sulfur, such as SiO$_2$, SiO$_x$, AlN, Al$_2$O$_3$, Si$_3$N$_4$, ZnS, BN, TiO$_2$, and TiN. Other useful inorganic and organic films may occur to those skilled in the art. These dielectric materials may be used alone or in admixture.

In one preferred embodiment of the present invention, the intermediate layer 26 which is formed contiguous to the lower surface 19 of the recording layer 18 contains at least two types of metal and metalloid compounds. At least two elements selected from metals and metalloids are present in the form of an oxide and/or nitride in the intermediate layer. The use of two or more types of oxide and nitride of two or more metals or metalloids is more effective than two or more types of oxide and nitride of a single metal or metalloid. At least two elements of metals and metalloids are preferably selected from Si, Al, Ti, Y, Zn and B. Most preferred elements are Si and Al.

Preferred examples of the nitride and oxide of these metals and metalloids are silicon nitride, aluminum nitride, titanium nitride, boron nitride, silicon oxide, aluminum oxide, titanium oxide, yttrium oxide and zinc oxide. A properly chosen combination of these compounds is used to form the intermediate layer.

A combination of oxide and nitride is preferred. A combination of oxide and nitride selected from silicon nitride, aluminum nitride, silicon oxide, and aluminum oxide is most preferred. These oxides and nitrides generally conform to their stoichiometry, but may have a composition deviating therefrom.

The proportion of oxide and nitride is such that the nitride is richer than the oxide, preferably the nitrogen quantity is about 1 to 20 times the oxygen quantity in atomic ratio. A nitride richer intermediate layer is more effective in maintaining the recording/reproducing performance of the recording layer stable and protecting the recording layer against corrosion. An oxide richer intermediate layer has the likelihood of output drop. A nitride too much richer intermediate layer is undesirable in view of strain.

The intermediate layer 26 may have a graded concentration of a predetermined element in a thickness direction. Preferably, the intermediate layer is made N and 0 rich on its side adjacent to the substrate. Alternatively, the intermediate layer may be made relatively 0 rich on its substrate side and relatively N rich on its recording layer side. Such a graded intermediate layer provides a recording medium which exhibits excellent recording/reproducing performance while minimizing deterioration with aging.

In a preferred embodiment wherein the metal and metalloid used are Al and Si, the ratio of Si/Al is not particularly limited. Preferably Si/Al ranges from 1:2 to 20:1 in atom ratio. Outside this range, durability is relatively poor.

The intermediate layer has a refractive index of from 1.8 to 3.0, preferably from 2.0 to 2.5 at a wavelength of 800 nm. An intermediate layer having a refractive index of less than 1.8 is rather low in Kerr rotational angle amplification, resulting in a reduced output. A refractive index of more than 3.0 results in a reduced output and an increased noise.

The intermediate layer may be formed by any desired one of gas phase film-forming techniques including sputtering, evaporation, ion plating, plasma CVD, and light CVD. Preferred techniques are multiple source sputtering using two or more targets of different compositions and reactive sputtering using oxygen.

The thickness of the intermediate layer preferably ranges from about 300 to 3,000 Å, more preferably from about 700 to 2,000 Å. Kerr rotational angle amplification is low and weatherability is poor with a thickness of less than about 300 Å. An intermediate layer having a thickness of more than about 3,000 Å will adversely affect the sensitivity and productivity of the medium.

The intermediate layer may contain some impurities. For example, it is permissible that argon and nitrogen are introduced from the film-forming atmosphere. Other impurities will be introduced from the source materials. For example, Fe, Ni, Cr, Cu, Mn, Mg, Ca, Na, and K may be contained in the intermediate layer.

The optical recording medium 10 of the present invention further includes an organic protective coating layer 20 on the upper protective layer 16 which is formed on the surface 17 of the magnetic thin-film layer 18 remote from the substrate.

The material of which the organic protective coating layer 20 is formed includes a variety of well-known organic materials. Preferably the organic protective coating layer 20 is a coating of a radiation-curable compound cured with radiation such as electron radiation and ultraviolet radiation.

Illustrative radiation-curable compounds include monomers, oligomers and polymers having contained or incorporated in their molecule groups capable of crosslinking or polymerizing upon exposure to radiation, for example, acrylic double bonds as given by acrylic and methacrylic acids having an unsaturated double bond capable of radical polymerization in response to an ionization energy and esters thereof, allyl double bonds as given by diallyl phthalate, and unsaturated bonds as given by maleic acid and maleic derivatives. The radiation-curable monomers used herein are those compounds having a molecular weight of less than 2,000 and the oligomers are those compounds having a molecular weight of 2,000 to 10,000.

The radiation-curable compounds having unsaturated double bonds which may be used as oligomers and monomers in the present invention include styrene, ethylacrylate, ethylene glycol diacrylate, ethylene glycol dimethacrylate, diethylene glycol diacrylate, diethylene glycol methacrylate, 1,6-hexaneglycol diacrylate, and 1,6-hexaneglycol dimethacrylate. More preferred are pentaerythritol tetraacrylate (and methacrylate), pentaerythritol triacrylate (and methacrylate), trimethylolpropane triacrylate (and methacrylate), trimethylolpropane diacylate (and methacrylate), polyfunctional oligoester acrylates (e. g., Aronix M-7100, M-5400, M-5500, M-5700, M-6250, M-6500, M-8030, M-8060, M-8100, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of phenol ethylene oxide adducts, compounds having a pentaerythritol fused ring represented by the following general formula and having an acryl or methacryl group or epsilon-caprolactone-acryl group attached thereto:

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

(Special acrylate A) (1)

(Special acrylate B) (2)

(Special acrylate C) (3)

(Special acrylate D) (4)

(Special acrylate E) (5)

(Special acrylate F) (6)

(Special acrylate G)

(Special acrylate H)

(Special acrylate I)

(Special acrylate J)

A: acrylic acid   X: polyhydric alcohol
Y: polybasic acid   (Special acrylate K)

A: acrylic acid   M: dihydric alcohol   N: dibasic acid
(Special acrylate L)

The radiation-curable oligomers include polyfunctional oligo-ester acrylates as represented by the following general formula:

wherein $R_1$ and $R_2$ are alkyl and n is an integer, and acryl-modified urethane elastomers, and derivatives thereof having such a functional group as COOH incorporated therein.

Also employable are radiation-curable resins which are prepared by modifying thermoplastic resins to be radiation sensitive.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives.

The thermoplastic resins which can be modified into radiation-curable resins include vinyl chloride copolymers, saturated polyester resins, polyvinyl alcohol resins, epoxy resins, phenoxy resins, cellulosic derivatives, etc.

Other examples of the resins which can be modified to be radiation curable include polyfunctional polyester resins, polyether ester resins, polyvinyl pyrrolidone resins and derivatives (e.g., PVP-olefin copolymers), polyamide resins, polyimide resins, phenol resins, spiroacetal resins, and acrylic resins comprising as a polymerization component at least one acryl or methacryl ester having a hydroxyl group.

The organic protective coating layer 20 of radiation-cured compound has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer 18. Films in excess of 30 μm thick are practically unacceptable because their shrinkage during curing causes the recording medium to be warped and cracks to occur in the protective layer.

The protective layer may be formed by coating an appropriate composition by any well-known coating methods such as spinner coating, gravure coating, spray coating, and dipping. The conditions under which the film is coated may be suitably chosen by taking into account the viscosity of the polymer component in the composition, the substrate surface state, and the intended coating thickness.

These radiation-curable resins may be cured by any of various well-known methods using electron or ultraviolet radiation.

For electron radiation curing, a radiation accelerator is preferably operated at an accelerating voltage of 100 to 750 kV, more preferably 150 to 300 kV to generate radiation having a sufficient penetrating power such that the object is exposed to a radiation dose of 0.5 to 20 megarad.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

The optical recording medium 10 of the present invention further includes a protective plate 24 disposed on the organic protective coating layer 20 through an adhesive layer 22. More particularly, the protective plate 24 is used when the medium is of single side recording type wherein recording and reproducing operations are carried out only from the lower surface 13 of the substrate 12 which is free of a magnetic thin-film layer.

The protective plate 24 may be of a resinous material. Since the resinous material of the protective plate need not be transparent, a variety of resins may be used, for example, thermoplastic resins such as polyethylene, polyvinyl chloride, polystyrene, polypropylene, polyvinyl alcohol, methacrylic resin, polyamide, polyvinylidene chloride, polycarbonate, polyacetal, and fluoro resin; and thermosetting resins such as phenol resin, urea resin, unsaturated polyester resin, polyurethane, alkyd resin, melamine resin, epoxy resin, and silicone resin.

It is also possible to form the protective plate 24 from an inorganic material such as glass and ceramics. The shape and dimensions of the protective plate 24 are approximately the same as the substrate 12.

The protective plate 24 is bonded to the organic protective coating layer 20 through the adhesive layer 22. The adhesive layer 22 may be of a hot-melt resin adhesive and has a thickness of about 1 to 100 μm.

Instead of the protective plate 24, two sets of substrate 12, magnetic thin-film layer 18, protective layer 14/16, and organic protective coating layer 20 may be prepared and bonded with an adhesive layer such that the magnetic thin-film layers may be opposed to each other. This results in a double sided recording type medium wherein recording and reproducing operations can be carried out from the outside surfaces of both the substrates.

The lower surface 13 of the substrate 12 and the top surface of the protective plate 24 which is remote from the magnetic thin-film layer 18 are preferably covered with suitable protective coatings. Such coatings may be formed from the same material as previously described for the organic protective coating layer 20.

The optical recording medium of the present invention having a protective layer of a specific composition formed adjacent to the upper and/or lower surface of a recording layer is satisfactorily durable and resistant to corrosion. Recording/reproducing performance including recording sensitivity and C/N is maintained excellent.

EXAMPLES

In order that those skilled in the art will better understand the practice of the present invention, examples of the present invention are given below by way of illustration and not by way of limitation.

Example 1

An optical recording disk having the structure as shown in FIG. 1 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 1 was formed on the substrate by sputtering. For some particular compositions, multiple source sputtering was employed. The protective layer was 800 Å thick for all samples. The composition of the protective layer contained boron oxide or aluminum oxide as component (c).

A magnetic thin-film layer 18 of Tb 21 at %-Fe 68 at %-Co 7 at %-Cr 4 at % alloy was formed on the protective layer 14 by sputtering to a thickness of 800 Å. The target used in sputtering was an iron (Fe) target having Tb, Co and Cr chips rested thereon.

Another protective layer 16 of vitreous material was formed on the magnetic thin-film layer 18. The composition and thickness of the upper protective layer 16 were the same as those of the lower protective layer 14.

The upper protective layer 16 was coated with a radiation-curable coating composition by spinner coating to form an organic protective coating layer 20. The coating composition contained 100 parts by weight of a multifunctional oligo-ester acrylate and 5 parts by weight of a light sensitizer. The coating of the composition was exposed to UV for 15 seconds into a cured film.

In this way, a series of samples were prepared as shown in Table 1. They were measured for the following properties.

(1) Durability

A thermal cycling test was carried out on a sample according to IEC-2-38 over a temperature range of from 10° C to +65° C at a relative humidity of 93%. This accelerated test was continued until the bit error rate reached twice the initial. The durability of the sample is expressed by the duration of the test continued. Under the conditions, spalling and cracking in the film largely contributed to an increase of bit error rate.

(2) Corrosion resistance

A high-temperature, high-humidity aging test was carried out. That is, a sample was stored at 60° C and 90% RH. This accelerated test was continued until the bit error rate reached twice the initial. The corrosion resistance of the sample is expressed by the duration of the test continued. Under the conditions, occurrence of pinholes largely contributed to an increase of bit error rate.

The results are shown in Table 1.

TABLE 1

| | Protective Layer Composition, wt % | | | | | | | | Durability (hr.) | Corrosion resistance (hr.) |
|---|---|---|---|---|---|---|---|---|---|---|
| | $SiO_2$ | $B_2O_3$ | $Al_2O_3$ | $Na_2O$ | $K_2O$ | BaO | CaO | SrO | | |
| 101 | 48.0 | 47.0 | — | 3.0 | 2.0 | — | — | — | >800 | >1000 |
| 102 | 55.0 | 40.0 | — | 3.0 | 2.0 | — | — | — | >800 | >1000 |
| 103 | 59.0 | 36.0 | — | 3.0 | 2.0 | — | — | — | >800 | >1000 |
| 104 | 42.0 | 53.0 | — | 3.0 | 2.0 | — | — | — | >800 | >1000 |
| 105* | 81.0 | 14.0 | — | 3.0 | 2.0 | — | — | — | 500 | 600 |
| 106* | 28.0 | 67.0 | — | 3.0 | 2.0 | — | — | — | 400 | 500 |
| 107 | 53.0 | 41.0 | — | 1.0 | 5.0 | — | — | — | >800 | >1000 |
| 108 | 53.0 | 46.0 | — | 0.5 | 0.5 | — | — | — | >800 | >1000 |
| 109* | 53.0 | 32.0 | — | 9.0 | 6.0 | — | — | — | >800 | 400 |
| 110* | 53.0 | 46.7 | — | 0.3 | 0 | — | — | — | 400 | 1000 |
| 111 | 53.0 | — | 40.5 | 4.0 | 2.5 | — | — | — | >800 | >1000 |
| 112 | 55.0 | — | 44.0 | 1.0 | 0 | — | — | — | >800 | >1000 |

TABLE 1-continued

|  | Protective Layer Composition, wt % | | | | | | | Durability (hr.) | Corrosion resistance (hr.) |
| --- | --- | --- | --- | --- | --- | --- | --- | --- | --- |
|  | $SiO_2$ | $B_2O_3$ | $Al_2O_3$ | $Na_2O$ | $K_2O$ | BaO | CaO | SrO | | |
| 113* | 80.0 | — | 15.0 | 3.0 | 2.0 | — | — | — | 500 | 600 |
| 114* | 55.0 | — | 44.7 | 0.3 | 0 | — | — | — | 300 | 1000 |
| 115 | 53.0 | — | 10.0 | 2.0 | 1.0 | 20.0 | 14.0 | — | >800 | >1000 |
| 116 | 53.0 | — | 20.0 | 2.0 | 1.0 | 14.0 | — | 10.0 | >800 | >1000 |
| 117 | 55.0 | 30.0 | — | 2.0 | 1.0 | 8.0 | 4.0 | — | >800 | >1000 |
| 118 | 55.0 | 20.0 | — | 1.0 | 0.5 | 12.0 | 11.5 | — | >800 | >1000 |
| 119* | 84.0 | 10.0 | 3.0 | 3.0 | — | — | — | — | 500 | 600 |
| 120* | 49.9 | 10.5 | 10.3 | — | — | 25.1 | 4.3 | — | 600 | >1000 |

*Comparison

Example 2

An optical recording disk having the structure as shown in FIG. 2 was prepared by repeating substantially the same procedure as sample No. 101 of Example 1. The compositon of the magnetic thin-film layer 18 was Tb 21 at %-Fe 72 at %-Co 7%. An intermediate layer 26 was formed between the magnetic thin-film layer 18 and the protective layer 14 by sputtering ZnS to a thickness of 800 Å. The resulting disk was designated sample No. 201.

Sample No. 201 was also tested for durability and corrosion resistance by the same procedures as described in Example 1. The results of sample No. 201 were nearly equivalent to those of sample No. 101.

Example 3

Disk samples were prepared by repeating the procedure of Example 1. The only difference is that the composition of the protective layer contained a mixture of boron oxide and aluminum oxide as component (c).

The results are shown in Table 2.

TABLE 2

|  | Protective Layer Composition, wt % | | | | | | | Durability (hr.) | Corrosion resistance (hr.) |
| --- | --- | --- | --- | --- | --- | --- | --- | --- | --- |
|  | $SiO_2$ | $Al_2O_3$ | $B_2O_3$ | $Na_2O$ | $K_2O$ | BaO | CaO | | |
| 301 | 53.0 | 25.0 | 17.0 | 3.0 | 2.0 | — | — | >800 | >1000 |
| 302 | 58.0 | 29.0 | 12.0 | 0.5 | 0.5 | — | — | >800 | >1000 |
| 303* | 82.0 | 4.0 | 9.0 | 3.0 | 2.0 | — | — | 550 | 650 |
| 304* | 30.0 | 18.0 | 47.0 | 3.0 | 2.0 | — | — | 400 | 600 |
| 305 | 54.0 | 30.0 | 15.0 | 0.5 | 0.5 | — | — | >800 | >1000 |
| 306 | 49.0 | 31.0 | 14.0 | 1.0 | 5.0 | — | — | >800 | >1000 |
| 307* | 53.7 | 33.0 | 13.0 | 0.3 | 0 | — | — | 400 | 1000 |
| 308* | 51.0 | 21.0 | 13.0 | 9.0 | 6.0 | — | — | 800 | 600 |
| 309* | 84.0 | 3.0 | 10.0 | 3.0 | — | — | — | 500 | 600 |
| 310* | 49.9 | 10.5 | 10.3 | — | — | 25.1 | 4.3 | 600 | >1000 |

*Comparison

Example 4

Disk samples were prepared by repeating the procedure of Example 2. The only difference is that the composition of the protective layer contained a mixture of boron oxide and aluminum oxide as component (c). The resulting disk was designated sample No. 401.

The test results of sample No. 401 were nearly equivalent to those of sample No. 301 with respect to durability and corrosion resistance.

Example 5

Disk samples were prepared by repeating the procedure of Example 1. The only difference is that the composition of the protective layer contained a mixture of boron oxide and aluminum oxide as component (c) and a divalent metal oxide as component (d).

The results are shown in Table 3.

TABLE 3

|  | Protective Layer Composition, wt % | | | | | | | | | Durability (hr.) | Corrosion resistance (hr.) |
| --- | --- | --- | --- | --- | --- | --- | --- | --- | --- | --- | --- |
|  | $SiO_2$ | $Al_2O_3$ | $B_2O_3$ | $Na_2O$ | $K_2O$ | BaO | CaO | MgO | ZnO | | |
| 501 | 52.0 | 6.0 | 12.0 | 3.0 | 2.0 | 21.0 | 0 | 0 | 4.0 | >800 | >1000 |
| 502 | 48.0 | 15.0 | 14.0 | 3.0 | 2.0 | 5.0 | 9.0 | 4.0 | 0 | >800 | >1000 |
| 503* | 64.0 | 3.0 | 10.0 | 3.0 | 2.0 | 12.0 | 0 | 0 | 6.0 | 600 | 800 |
| 504 | 54.0 | 7.0 | 13.0 | 0.5 | 0.5 | 21.0 | 0 | 0 | 4.0 | >800 | >1000 |
| 505 | 52.0 | 6.0 | 11.0 | 1.0 | 5.0 | 21.0 | 0 | 0 | 4.0 | >800 | >1000 |
| 506* | 54.5 | 7.5 | 12.2 | 0.3 | 0 | 21.0 | 0 | 0 | 4.5 | 500 | 1000 |
| 507* | 46.4 | 6.0 | 11.2 | 9.0 | 6.0 | 18.0 | 0 | 0 | 3.4 | 800 | 600 |
| 508* | 84.0 | 3.0 | 10.0 | 3.0 | — | — | — | — | — | 500 | 600 |
| 509* | 49.9 | 10.5 | 10.3 | — | — | 25.1 | 4.3 | — | — | 600 | >1000 |

*Comparison

Example 6

Disk samples were prepared by repeating the procedure of Example 2. The only difference is that the composition of the protective layer contained a mixture of boron oxide and aluminum oxide as component (c) and a divalent metal oxide as component (d). The resulting disk was designated sample No. 601.

The test results of sample No. 601 were nearly equivalent to those of sample No. 501 with respect to durability and corrosion resistance.

Example 7

An optical recording disk having the structure as shown in FIG. 1 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 4 was formed on the substrate by multiple source sputtering. Reactive multiple source sputtering was carried out in an oxygen-containing atmosphere using targets of a predetermined glass material and at least one rare earth element (R) of yttrium, lanthanides and actinides. The contents expressed in % by weight in Table 4 were determined by analyzing metal elements in the protective layer by Auger spectroscopy, and then calculating the contents of the stoichiometric oxide composition of the elements. The content of each metal element calculated as its stoichiometric oxide composition is expressed in % by weight based on the total weight of the stoichiometric oxides excluding the rare earth element (R). R/M in Table 4 is the atom % of rare earth element R based on metal component M which is the total of Si, alkali metal M(I), Al, B and optionally, divalent metal M(II) in the protective layer. The protective layer was 800 Å thick for all samples.

A magnetic thin-film layer 18 of Tb 25 at %-Fe 63 at % Co 7 at %-Ti 5 at % alloy was formed on the protective layer 14 by sputtering to a thickness of 800 Å. The target used in sputtering was an iron (Fe) target having Tb, Co and Ti chips rested thereon.

Another protective layer 16 of vitreous material was formed on the magnetic thin-film layer 18 to a thickness of 800 Å. The composition of the upper protective layer 16 was the same as that of the lower protective layer 14 of sample No. 709 shown in Table 4.

The upper protective layer 16 was coated with a radiation-curable coating composition by spin coating to form an organic protective coating layer 20. The coating composition contained 100 parts by weight of a multifunctional oligo-ester acrylate and 5 parts by weight of a light sensitizer. The coating of the composition was exposed to UV for 15 seconds into a cured film.

In this way, a series of samples were prepared as shown in Table 4. They were measured for the following properties.

(1) Durability

A thermal cycling test was carried out on a sample according to IEC-2-38 over a temperature range of from −10° C to +60° C at a relative humidity of 90%. This accelerated jet was continued until the burst error reached twice the initial. The durability of the sample is expressed by the duration of the test continued. Under the conditions, spalling and cracking in the film largely contributed to an increase of burst error.

(2) Corrosion resistance

A high-temperature, high-humidity aging test was carried out. That is, a sample was stored at 80° C and 80% RH. This accelerated test was continued until the burst error reached twice the initial. The corrosion resistance of the sample is expressed by the duration of the test continued. Under the conditions, occurrence of pinholes largely contributed to an increase of burst error.

(3) C/N

The C/N (carrier-to-noise ratio) of a sample expressed in dB was measured under the following conditions.

Rotating speed: 4 m/sec.
Carrier frequency: 1.0 MHz
Resolution: 30 KHz
Video band width: 100 Hz
Recording power: 3–6 mW at 830 nm
Reproducing power: 1 mW at 830 nm The results are shown in Table 4.

TABLE 4

| Sample No | Protective Layer Composition | | | | | | | | | Durability (hr.) | Corrosion resistance (hr.) | C/N ratio (dB) |
|---|---|---|---|---|---|---|---|---|---|---|---|---|
| | SiO$_2$ (wt %) | B$_2$O$_3$ (wt %) | Al$_2$O$_3$ (wt %) | Na$_2$O (wt %) | K$_2$O (wt %) | BaO (wt %) | CaO (wt %) | R | R/M (at %) | | | |
| 701 | 55 | — | 40 | 3 | 2 | — | — | Y | 80 | ≧700 | ≧800 | 49 |
| 702 | 42 | 28 | — | 3 | 2 | 20 | 5 | Y | 120 | ≧700 | ≧800 | 47 |
| 703* | 55 | 30 | — | 9 | 6 | — | — | Y | 80 | ≧700 | 450 | 49 |
| 704* | 55 | 45 | — | — | — | — | — | Y | 80 | 700 | 800 | 49 |
| 705 | 42 | 20 | 8 | 3 | 2 | 20 | 5 | Sm | 80 | ≧700 | ≧800 | 48 |
| 706* | 49.9 | 10.5 | 10.3 | — | — | 25.1 | 4.3 | — | — | 500 | ≧700 | 43 |
| 707 | 42 | 20 | 8 | 3 | 2 | 20 | 5 | Y + Eu | 50/30 | ≧700 | ≧800 | 49 |
| 708 | 42 | 20 | 8 | 3 | 2 | 20 | 5 | Y + Sm | 60/20 | ≧700 | ≧800 | 49 |
| 709 | 42 | 20 | 8 | 3 | 2 | 20 | 5 | Y + Eu + Sm | 40/20/20 | ≧700 | ≧800 | 49 |
| 710* | 81 | 14 | — | 3 | 2 | — | — | Y | 80 | 500 | 600 | 49 |
| 711* | 28 | 67 | — | 3 | 2 | — | — | Y | 80 | 250 | 350 | 46 |

*Comparison

Example 8

An optical recording disk having the structure as shown in FIG. 2 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 5 was formed on the substrate by sputtering. For some particular compositions, multiple source sputtering was employed. The protective layer was 500 Å thick for all samples. An intermediate layer 26 of a material having the composition shown in Table 5 was formed on the protective layer by sputtering. For some particular compositions, multiple source sputtering was employed. The intermediate layer was 800 Å thick for all samples. The proportion of components in the intermediate layer is expressed by their sputtering rate (% by weight) calculated on the basis of the stoichiometric composition of the oxides and nitrides indicated in the table heading. The refractive index of the intermediate layer at 800 nm is also reported in Table 5. The refractive index was changed by a choice of source composition and sputtering conditions including gas pressure and gas composition.

A magnetic thin-film layer 18 of Tb 21 at %-Fe 68 at %-Co 7 at %-Cr 4 at % alloy was formed on the intermediate layer 26 by sputtering to a thickness of 800 Å.

The target used in sputtering was an iron (Fe) target having Tb, Co and Cr chips rested thereon.

Another protective layer 16 of vitreous material was formed on the magnetic thin-film layer 18. The composition of the upper protective layer 16 was the same as that of the lower protective layer 14. The upper protective layer 16 had a thickness of 800 Å.

The upper protective layer 16 was coated with a radiation-curable coating composition by spinner coating to form an organic protective coating layer 20. The coating composition contained 100 parts by weight of a multifunctional oligo-ester acrylate and 5 parts by weight of a light sensitizer. The coating of the composition was exposed to UV for 15 seconds into a cured film.

In this way, a series of samples were prepared as shown in Table 5. They were measured for the following properties.

(1) Initial C/N

The initial C/N (carrier-to-noise ratio) of a sample expressed in dB was measured under the following conditions.

Rotating speed: 4 m/sec.
Carrier frequency: 1.0 MHz
Resolution: 30 KHz
Recording power: 3–6 mW at 830 nm
Reproducing power: 1 mW at 830 nm (2) Durability A thermal cycling test was carried out on a sample according to IEC-2-38 over a temperature range of from −10° C to +65° C at a relative humidity of 93%. This accelerated test was continued until the bit error rate reached twice the initial. The durability of the sample is expressed by the duration of the test continued. Under the conditions, spalling and cracking in the film largely contributed to an increase of bit error rate.

After a sample was kept for 1,000 hours at 60° C and 90% RH, it was observed for a change of bit error rate, film spalling, and a change of appearance.

The bit error rate was measured by recording an NRZ signal under the above-mentioned conditions. The initial bit error rate was $3 \times 10^{-6}$.

(3) Corrosion resistance

A high-temperature, high-humidity aging test was carried out. That is, a sample was stored at 70° C and 90% RH. This accelerated test was continued until the bit error rate reached twice the initial. The corrosion resistance of the sample is expressed by the duration of the test continued. Under the conditions, occurrence of pinholes largely contributed to an increase of bit error rate.

The results are shown in Table 5.

TABLE 5

| | Composition of Protective Layers 14, 16, wt % | | | | | | | | | Intermediate Layer Sputtering rate wt % | | | |
|---|---|---|---|---|---|---|---|---|---|---|---|---|---|
| | $SiO_2$ | $Al_2O_3$ | $B_2O_3$ | $Na_2O$ | $K_2O$ | BaO | CaO | MgO | ZnO | $SiO_2$ | $Al_2O_3$ | $Si_3N_4$ | AlN |
| 801 | 53 | 42 | — | 3.0 | 2.0 | — | — | — | — | 10 | 5 | 70 | 15 |
| 802 | 53 | 42 | — | 3.0 | 2.0 | — | — | — | — | 100 | — | — | — |
| 803 | 48 | — | 47 | 3.0 | 2.0 | — | — | — | — | 5 | 10 | 70 | 15 |
| 804 | 48 | — | 47 | 3.0 | 2.0 | — | — | — | — | — | 100 | — | — |
| 805 | 55 | — | 30 | 2.0 | 1.0 | 8 | 4 | — | — | 10 | 5 | 70 | 15 |
| 806 | 55 | — | 30 | 2.0 | 1.0 | 8 | 4 | — | — | — | — | 100 | — |
| 807 | 53 | 25 | 17 | 3.0 | 2.0 | — | — | — | — | 10 | 10 | 60 | 20 |
| 808 | 53 | 25 | 17 | 3.0 | 2.0 | — | — | — | — | — | — | — | 100 |
| 809 | 48 | 6 | 12 | 1.0 | 1.0 | 20 | 10 | — | 2 | 10 | 5 | 70 | 15 |
| 810 | 48 | 6 | 12 | 1.0 | 1.0 | 20 | 10 | — | 2 | 20 | — | 80 | — |
| 811 | 48 | 6 | 12 | 1.0 | 1.0 | 20 | 10 | — | 2 | — | 20 | — | 80 |
| 812 | 53 | 41 | — | 1.0 | 5.0 | — | — | — | — | 5 | 5 | 80 | 10 |
| 813* | 80 | 15 | — | 3.0 | 2.0 | — | — | — | — | 5 | 5 | 80 | 10 |
| 814* | 53 | 46.7 | — | 0.3 | 0 | — | — | — | — | 5 | 5 | 80 | 10 |
| 815 | 45 | — | 20 | 1.0 | 0.5 | 22 | 11.5 | — | — | 5 | 5 | 80 | 10 |
| 816* | 48 | — | 19 | 9.0 | 6.0 | 5 | 9 | 4 | — | 5 | 5 | 80 | 10 |
| 817 | 53 | 25 | 17 | 3.0 | 2.0 | — | — | — | — | 5 | 5 | 80 | 10 |
| 818* | 30 | 18 | 47 | 3.0 | 2.0 | — | — | — | — | 5 | 5 | 80 | 10 |
| 819 | 54 | 7 | 13 | 0.5 | 0.5 | 21 | — | — | 4 | 5 | 5 | 80 | 10 |
| 820* | 54.5 | 7.5 | 12.2 | 0.3 | 0 | 21 | — | — | 4.5 | 5 | 5 | 80 | 10 |
| 821* | — | — | — | — | — | — | — | — | — | 10 | 5 | 70 | 15 |

| | Refractive index | C/N ratio (dB) | Durability Time (hr.) | Durability Bit error rate (× $10^{-6}$) | Appearance | Corrosion resistance (hr.) |
|---|---|---|---|---|---|---|
| 801 | 2.3 | 55.5 | >800 | 3 | | >1000 |
| 802 | 1.6 | 47 | >800 | 5 | some spalling | >1000 |
| 803 | 2.3 | 55.5 | >800 | 3 | | >1000 |
| 804 | 1.6 | 47 | >800 | 5 | some spalling | >1000 |
| 805 | 2.3 | 55.5 | >800 | 3 | | >1000 |
| 806 | 2.2 | 52 | >800 | 4 | some spalling | >1000 |
| 807 | 2.2 | 55.5 | >800 | 3 | | >1000 |
| 808 | 2.3 | 52 | >800 | 4 | some spalling | >1000 |
| 809 | 2.3 | 55.5 | >800 | 3 | | >1000 |
| 810 | 2.0 | 51 | >800 | 3.5 | | >1000 |
| 811 | 2.1 | 51 | >800 | 3.5 | | >1000 |
| 812 | 2.4 | 56 | >800 | 3 | | >1000 |
| 813* | 2.4 | 56 | 600 | 6 | | >1000 |
| 814* | 2.4 | 56 | 400 | 4 | | >1000 |
| 815 | 2.4 | 56 | >800 | 3 | | >1000 |
| 816* | 2.4 | 56 | 800 | 6.5 | | 600 |
| 817 | 2.4 | 56 | >800 | 3 | | >1000 |
| 818* | 2.4 | 56 | 800 | 6.5 | | 600 |
| 819 | 2.4 | 56 | >800 | 3 | | >1000 |
| 820* | 2.4 | 56 | 700 | 4.5 | | >1000 |

TABLE 5-continued

| | | | | | | |
|---|---|---|---|---|---|---|
| 821* | 2.2 | 55 | 600 | 10 | spalling | 600 |

*Comparison

The results of Examples 1 to 8 show the effectiveness of the present invention.

Similar results were obtained with phase conversion type recording layers of Te-Ge, $TeO_x$, and Te-Se.

Obviously, numerous modifications and variations of the present invention are possible in light of the above teachings. It is therefore to be understood that within the scope of the appended claims, the invention may be practiced otherwise than as specifically described herein.

We claim:

1. A magneto optical recording medium comprising a substrate,
   a recording layer formed on the substrate, said recording layer having upper and lower surfaces disposed remote from and adjacent to the substrate, respectively, and
   at least one protective layer formed adjacent to the upper or lower surface of said recording layer,
   said protective layer having a composition comprising, in % by weight based on the total weight of the composition,
   (a) about 40 to 60% of silicon oxide calculated as $SiO_2$,
   (b) about 0.5 to 10% of an alkali metal oxide, and
   (c) about 30 to 59.5% of aluminum oxide, boron oxide, or a mixture of aluminum oxide and boron oxide.

2. The magneto optical recording medium of claim 1 wherein the protective layer composition further comprises (d) up to about 29.5% of a metal oxide represented by M(II)O wherein M(II) is a divalent metal, provided that the total of components (c) and (d) ranges from about 30 to 59.5%.

3. The magneto optical recording medium of claim 2 wherein the content of metal oxide represented by M(II)O ranges from about 10 to 49.5%.

4. The magneto optical recording medium of claim 1 wherein the content of alkali metal oxide ranges from about 1.0 to 7.0%.

5. The magneto optical recording medium of claim 1 wherein component (c) is a mixture of aluminum oxide and boron oxide with the content of boron oxide ranging from about 1 to 40%.

6. The magneto optical recording medium of claim 1 wherein component (c) is a mixture of aluminum oxide and boron oxide with the content of aluminum oxide ranging from about 3 to 45%.

7. The magneto optical recording medium of claim 1 wherein the protective layer composition further comprises at least one rare earth element selected from the group consisting of yttrium, lanthanide elements and actinide elements.

8. The magneto optical recording medium of claim 1 wherein the recording layer is comprised of a magnetic thin film.

9. The magneto optical recording medium of claim 1 which further comprises an intermediate layer formed contiguous to the lower surface of said recording layer from at least one member selected from the group consisting of an oxide, carbide, nitride, and sulfide.

10. The magneto optical recording medium of claim 9 wherein the intermediate layer contains at least one member selected from each of the groups consisting of metal compounds and metalloid compounds, wherein said members selected from metals and metalloids compounds are present in the form of oxides or nitrides.

11. The magneto optical recording medium of claim 1 wherein one protective layer is formed adjacent to the upper surface of said recording layer and another protective layer is formed adjacent to the lower surface of said recording layer,
    wherein at least one of said protective layer formed adjacent to the upper surface and said protective layer formed adjacent to the lower surface has said composition comprising, in % by weight based on the total weight of the composition,
    (a) about 40 to 60% of silicon oxide calculated as $SiO_2$,
    (b) about 0.5 to 10% of an alkali metal oxide, and
    (c) about 30 to 59.5% of aluminum oxide, boron oxide, or a mixture of aluminum oxide and boron oxide.

12. A magneto optical recording medium comprising a substrate,
    a recording layer formed on the substrate, said recording layer having upper and lower surfaces disposed remote from and adjacent to the substrate, respectively, and
    at least one protective layer formed adjacent to the upper or lower surface of said recording layer,
    said protective layer having a composition comprising, in % by weight based on the total weight of the composition,
    (a) about 40 to 60% of silicon oxide calculated as $SiO_2$,
    (b) about 0.5 to 10% of an alkali metal oxide, and
    (c) about 10 to 49.5% of aluminum oxide, boron oxide, or a mixture of aluminum oxide and boron oxide, and
    (d) about 10 to 49.5% of a metal oxide represented by M(II)O wherein M(II) is a divalent metal.

13. The magneto optical recording medium of claim 12 wherein the protective layer composition further comprises at least one rare earth element selected from the group consisting of yttrium, lanthanide elements and actinide elements.

14. The magneto optical recording medium of claim 13 wherein the rare earth element is present in an amount of about 3 to 175 atom % based on the total of silicon, alkali metal, and aluminum and/or boron.

15. The magneto optical recording medium of claim 7 wherein the rare earth element is present in an amount of about 3 to 175 atom % based on the total of silicon, alkali metal, and aluminum and/or boron.

* * * * *